Sept. 28, 1937.  E. E. LACKEY ET AL  2,094,543
MAP PROJECTION APPARATUS
Filed Aug. 11, 1936
Fig. 1.
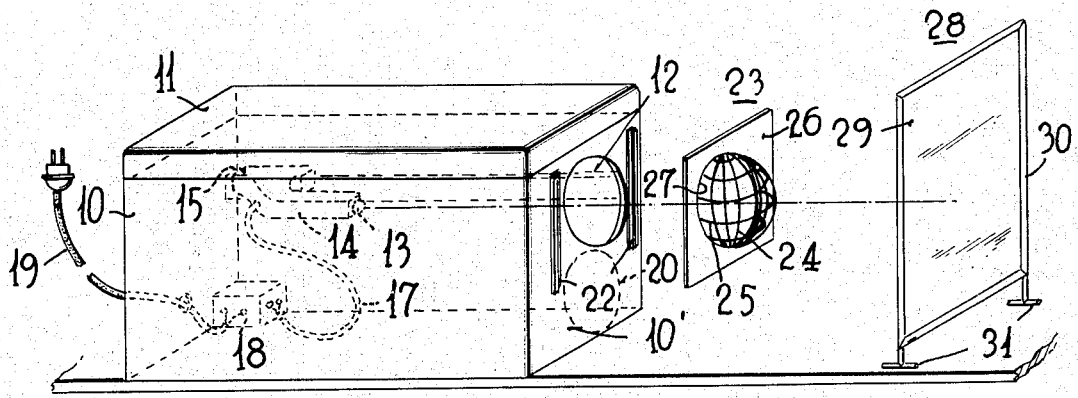
Fig. 2.
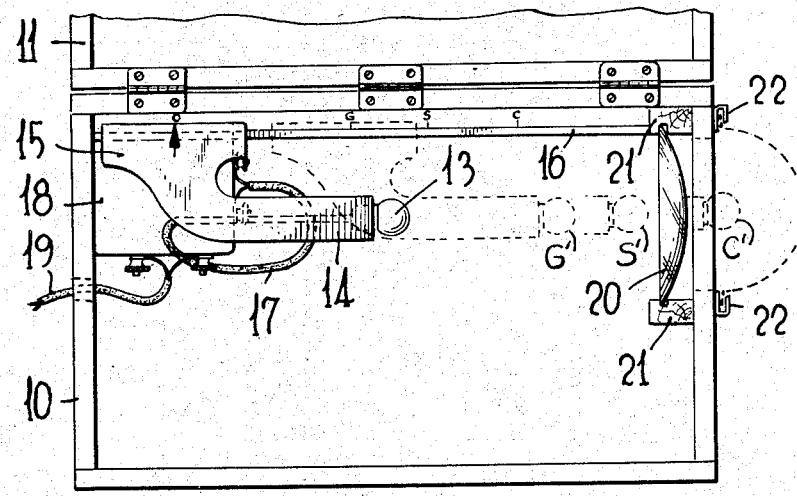
Fig. 3.
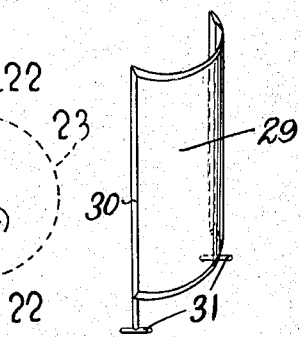
Fig. 4.
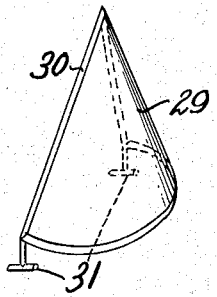
Fig. 5.  Fig. 6.  Fig. 7.  Fig. 8.
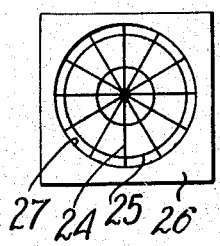 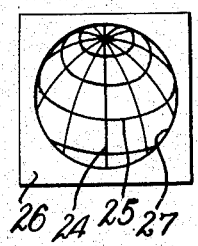 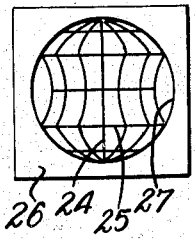 
Inventors
Earl E. Lackey
Paul J. Lackey Patented Sept. 28, 1937

2,094,543

UNITED STATES PATENT OFFICE 2,094,543

MAP PROJECTION APPARATUS

Earl E. Lackey, Lincoln, Nebr., and Paul G. Lackey, Washington, D. C.

Application August 11, 1936, Serial No. 95,408

6 Claims. (Cl. 88—24)

This invention relates to apparatus for use in the instruction of geography, and more particularly, the theory of map projection.

In the study of geography the use of maps is essential. In order that these may be fully understood some knowledge of map construction is fundamentally necessary. The mathematical projection of an area from a non-developable spherical surface, such as the earth's surface, onto a developable or plane surface involves many complex problems. For this reason many different methods of map projection have been devised, each having certain desirable peculiarities dependent upon the use to be made of the map. Due to the inherent difficulties entailed in map projection, distortions of either areas or distances, or both, are introduced. These distortions vary widely in the different projections as is well understood by one familiar with maps. In the explanation of these variations it is desirable to illustrate graphically the principles of the various methods of map construction, since from a visual presentation the individual distinctions and characteristics of each of the various types of projections can be more clearly noted and studied.

Therefore it is an object of this invention to provide a compact, portable projection apparatus for demonstrating the characteristics of various types of map projections.

More specifically, it is an object of this invention to provide apparatus for producing the projection of a hemispherically shaped map of an equatorial, polar, or an oblique section as an orthographic, stereographic and globular projections respectively, onto a flat translucent screen.

A further object of this invention is to provide apparatus for producing the projection of a hemispherically shaped map of an equatorial section as cylindrical and secant-cylindrical projections onto tangent and secant semi-cylindrical translucent screens.

A still further object of this invention is to provide apparatus for producing the projection of a hemispherically shaped map of an equatorial section as conical and secant-conical projections onto tangent and secant semi-conical screens.

Other and further objects and advantages of the invention will become apparent as the disclosure proceeds and the description is read in conjunction with the accompanying drawing, and its scope will be pointed out with particularity in the appended claims.

Referring now to the drawing:

Fig. 1 illustrates an exploded perspective view of one arrangement of the apparatus;

Fig. 2 illustrates a top view of the projector with the cover opened;

Fig. 3 illustrates a semi-cylindrical viewing screen;

Fig. 4 illustrates a semi-conical viewing screen;

Figs. 5, 6, 7, 8, illustrate various modifications of hemispherically shaped maps.

Referring to Figs. 1 and 2, the projector comprises a housing 10 of any suitable material such as wood, which is provided with a hinged cover 11 allowing access to the interior of the housing. One end 10' of the housing is provided with a circular aperture or light passage 12. A light source 13 is provided in the inclosing housing, it being mounted upon an arm 14 extending toward the light passage from the light source carriage 15. The carriage is slidably mounted upon a supporting guide rail 16 so as to allow movement of the light source from a position in the housing remote from the light passage longitudinally along the axis of the light passage toward and through the light passage. The light source in this instance is shown as a low voltage electric lamp connected by a flexible conductor 17 to a suitable step-down transformer 18, such as of the bell ringing type, to a suitable source of electric current by conductor 19.

Mounted inside of the housing between the light source and the light passage, preferably upon the end wall 10' is a suitable plano-convex condensing lens 20 for procuring a beam of parallel light rays through the light passage, which is desired for certain projections as will be pointed out hereinafter. This lens is slidably mounted in grooved supporting members 21 allowing movement of the lens away from the light passage when its use is not required.

On the exterior of the end wall 10' is provided a pair of channel members 22 for supporting various spherically shaped maps, that is, maps having a spherical curvature, which may be slid therein into position centrally over the light passage.

One example of a spherically shaped map is shown at 23 as an equatorial hemispherical section of a globe. The map shown in this instance for purposes of illustration only, defines meridians and parallels which are formed of wires 24 and 25 respectively and fastened at their ends to the supporting plate 26 adjacent the edge of the circular aperture 27 located centrally therein. The ends of the meridians 24 are fastened together at diametrically opposite points on the supporting plate which points represent the poles of the hemisphere. As shown, these meridians are spaced thirty degrees apart, though of course, any convenient number of meridians may be used, with the appropriate spacing. The parallels 25 cross the meridians at right angles and conform in shape together with the meridians so that the complete configuration resembles an equatorial hemisphere. As shown, the parallels are also spaced thirty degrees apart, though of course, any convenient number of parallels may be used with the appropriate spacing.

Other modifications of hemispherically shaped maps are shown in Figs. 5 and 6. These maps are constructed in a manner similar to the equatorial section described above, except that Fig. 5 illustrates a polar section, and Fig. 6 an oblique section of a globe.

A viewing or projection screen shown at 28 comprises a plane sheet 29 of some suitable translucent material such as frosted cellophane, mounted in a suitable frame 30 to provide rigidity to the screen, which frame is provided with standards 31.

The operation of the apparatus for producing an orthographic projection will now be described. The hemispherical map 23 is placed in the guides 22 of the housing end wall so that it is centered relative to the light passage. The plane screen 28 is then placed in a vertical position tangentially to the hemispherical map. The condensing lens is moved into position over the light passage, while the lamp and carriage are moved to the position O as indicated on the guide rail 16. The lamp and carriage are shown in this position in full line in Fig. 2 which is in the end of the housing remote from the light passage, a sufficient distance from the condensing lens so as to procure a fairly well distributed beam of light therethrough. When the lamp is illuminated by its connection with the source of current, the diverging rays of light are caught by the condensing lens and are projected parallel to each other casting the shadow of the hemispherical map onto the screen. Due to the translucency of the screen the shadow may be viewed from the reverse side. The shadow or image thus formed on the screen resembles an orthographic projection of the equatorial hemisphere, and from this projection the characteristics of this type of map projection may be studied. The equatorial map may be replaced by the polar or oblique maps shown in Figs. 5 and 6 in this type of projection.

For producing a stereographic projection, the condensing lens is removed from in front of the light passage and the lamp carriage is moved toward the light passage to the position marked S on the guide rail. The lamp is shown in dotted lines in this position at S' and in this position it is spaced a distance equal to the radius of the map from the radial center of the hemispherical map in place in the guides 22. This point S, being at the end of the central perpendicular diameter of the map, is well known by those skilled in the art as the point of projection for this type of map. The plane screen 28 is then placed tangentially to the hemispherical map, and the shadow cast upon it assumes the characteristics of a stereographic projection. The equatorial map may be replaced by the polar or oblique maps also in this type of projection.

For producing a globular projection, the operation of the apparatus is the same as that for the stereographic projection, except that the lamp carriage is moved to the position marked G on the guide rail, which places the lamp in the position indicated in dotted lines at G'. The lamp in this position is spaced from the radial center of the map a distance equal to 1.7 times the radius of curvature of the map. This point is well known by those versed in the art as the point of projection for this type of map. The equatorial map may be replaced by the polar or oblique maps also in this type of projection.

For producing a cylindrical projection, a semi-cylindrical screen such as that shown in Fig. 3 is used in conjunction with the equatorial map. This screen is constructed similarly to the plane screen 28 except that it is semi-cylindrical in shape having but a slightly larger radius of curvature than the hemispherical map so that it will fit snugly around the map when it is placed tangentially thereto. With the equatorial map in place over the light passage and with the semi-cylindrical screen fitted around the map, tangentially thereto, the lamp carriage is moved to position marked C on the guide rail. With the carriage in this position, the lamp, being mounted on the forwardly extending arm 14, is passed through the light passage 12 in the housing end wall and is at the radial center of the hemispherical map as indicated in dotted lines at C'. The shadow cast upon the screen when the lamp is illuminated assumes the characteristics of a cylindrical projection.

For producing a conic projection, the operation of the apparatus is the same as that for the cylindrical projection, except that a semi-conical screen is used. This screen as shown in Fig. 4 is constructed similarly to the plane and cylindrical screens except that it is of a semi-conical shape. It is of such size that it may be fitted snugly over the hemispherical map with its edges abutting the plate 26 upon which the map is mounted. Of course, the cone angle may be of any convenient, or desired size, such as approximately 60 degrees as shown. The shadow formed upon this screen when it is positioned over the equatorial map and tangentially thereto assumes the characteristics of a conic projection.

For producing a secant-cylindrical projection, a modified equatorial map is used such as shown in Fig. 7. In the construction of this map, any two corresponding parallels on opposite sides of the equator are selected as standard parallels, as for example the 30° N. and the 30° S. parallels as shown. The portions of the meridians between these standard parallels are curved inwardly without being shortened, the inwardly curved portion of each meridian lying in the same plane as the remaining normal portions. The equatorial parallel, however, is shortened due to the decrease of the equatorial circumference. A semi-cylindrical screen similar to that shown in Fig. 6 is used with this map. This screen, however, must have a radius of curvature just slightly larger than the radius of curvature of the standard parallels so that when the screen is fitted against the map, both standard parallels will fit snugly against the inner surface of the screen. With this map and screen, the procedure for producing a secant-cylindrical projection is the same as that for producing the cylindrical projection described above.

For producing a secant-conical projection, a modified equatorial map is used such as shown in Fig. 8. In the construction of this map, any two parallels, either above, or below the equator are selected as standard parallels, as for example, the 10° N. and the 50° N. parallels as shown. The meridians between these standard parallels are curved inwardly in the same manner as in the construction of the secant-cylindrical map. A semi-conical screen similar to that shown in Fig. 4 is used with this map except that it must have such a conical angle so that when it is fitted over the map with its edges abutting the supporting plate of the map, both standard parallels will fit snugly against the inner surface of the screen. With this map and screen, the procedure for producing a secant-conical projection is the same as that for producing the conical projection described above.

The hemispherically shaped maps described above consist of wires suitably arranged in the form of a hemisphere upon a supporting plate, but it is obvious that other modifications could be used equally satisfactorily. For example, the meridians and parallels could be traced in opaque lines upon a hemisphere of some transparent material such as glass or celluloid. It is equally obvious that the hemisphere could be opaque with the meridians and parallels thereon being transparent so as to allow the passage of light therethrough.

Another modification of a map comprises a semi-transparent hemispherically shaped map defining in opaque lines the various continental bodies of a hemisphere, with or without meridians and parallels described thereon. By the use of such a map, the distortions due to projection onto a developable surface such as one of the screens described above, can be noted with respect to certain portions of different continents.

Further, though it is preferred in certain instances to use such modifications of maps in the shape of a complete hemisphere, in other instances, for other specific types of projections, it is desirable to use configurations of meridians and parallels, or three-dimensional maps in the shape of a segment of a sphere greater or less than a hemisphere. Also, other modified hemispheres besides those suggested in Figs. 7 and 8 may be used with the apparatus we have invented since these are referred to merely for purposes of illustration.

It is intended in the claims by the use of the term, spherically curved map, to include all various modifications of three dimensional maps suggested above having or defining, in whole or a part thereof, a spherically curved surface and other similar modifications which would readily suggest themselves to one skilled in the art from a perusal of this disclosure. While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim as new and desire to secure by Letters Patent, is:—

1. A map projection apparatus comprising a housing having a light passage in a wall thereof, a map having a substantially hemispherical curvature and comprising opaque delineations of a section of the earth's surface and otherwise being light transmitting centrally positioned over said light passage and the convex surface of said map extending outwardly therefrom, a slidable carriage in said housing carrying a light source so arranged that the light source may be moved along the axis of said light passage, said light source being mounted upon an arm projecting from said carriage toward said light passage and movable through a plurality of positions from the radial center of said map to a position in the remote end of said housing and a translucent screen tangent to said map for receiving the shadow of said map projected by said light source from any one of said plurality of positions.

2. A map projection apparatus comprising a housing having a light passage in a wall thereof, a light source mounted in said housing for projecting light rays through said passage, said light source being movable along the axis of said passage to vary the conic angle of the light rays projected through said passage, a condensing lens mounted in said housing and movable into alignment with said light source and said light passage to change the light rays projected through said passage from conic to parallel formation, a substantially hemispherically curved map comprising opaque means delineating meridians and parallels and otherwise being light transmitting centrally positioned over said light passage and the convex surface of said map extending outwardly therefrom, and a screen in abutting relationship with said map for receiving the shadow of said map.

3. A map projection apparatus comprising a housing having a light passage in a wall thereof, a hemispherically curved map comprising opaque means delineating meridians and parallels and otherwise being light transmitting centrally positioned over said light passage and the convex surface of said map extending outwardly therefrom, a slidable carriage in said housing carrying a light source so arranged that the light source may be moved along the axis of said light passage and through said passage from the radial center of said map to a position in the remote end of said housing, and a semi-cylindrical translucent screen positioned tangentially around said map for receiving the shadow of said map projected by said light source positioned at the radial center of said map.

4. A map projection apparatus comprising a housing having a light passage in a wall thereof, a map comprising spherically curved opaque means delineating meridians and parallels and otherwise being light transmitting centrally positioned over said light passage and the convex surface of said map extending outwardly therefrom, a slidable carriage in said housing carrying a light source so arranged that the light source may be moved along the axis of the said light passage and through said light passage from the radial center of said map to a position in the remote end of said housing, and a semi-conical translucent screen positioned tangentially around said map for receiving the shadow of said map projected by said light source positioned at the radial center of said map.

5. A map projection apparatus comprising a housing having a light passage in a wall thereof, a substantially hemi-spherically curved map comprising means delineating meridians and parallels of an equatorial section of the earth's surface, said map being otherwise light transmitting, a portion of said map arranged in an outwardly extending spherically curved configuration and another portion of said map between two parallels thereof curved inwardly, said map being centrally positioned over said light passage with the spherical convexity of said map extending outwardly from said light passage, a light source in said housing so arranged that said light source may be moved along the axis of said light passage and through said passage from the radial center of said map to a position in the remote end of said housing, and a screen positioned against said map for receiving the shadow thereof.

6. A map projection apparatus comprising a housing having a light passage in a wall thereof, a substantially hemi-spherically curved map comprising means delineating meridians and parallels of an equatorial section of the earth's surface, said map being substantially otherwise light transmitting, a portion of said map arranged in an outwardly extending spherically curved configuration and another portion of said map between two parallels of said map being curved inwardly, said map being centrally positioned over said light passage with the spherical convexity of said map extending outwardly from said light passage, a light source mounted in said housing so arranged that the light source may be moved along the axis of said light passage and through said passage from the radial center of said map to a position in the remote end of said housing, and a curved translucent screen positioned around said map in abutting relationship with said two parallels for receiving the shadow of said map.

EARL E. LACKEY.
PAUL G. LACKEY.